A. E. JACOBS.
SPELLING BOARD.
APPLICATION FILED DEC. 8, 1909.
1,094,570.
Patented Apr. 28, 1914.
2 SHEETS—SHEET 1.
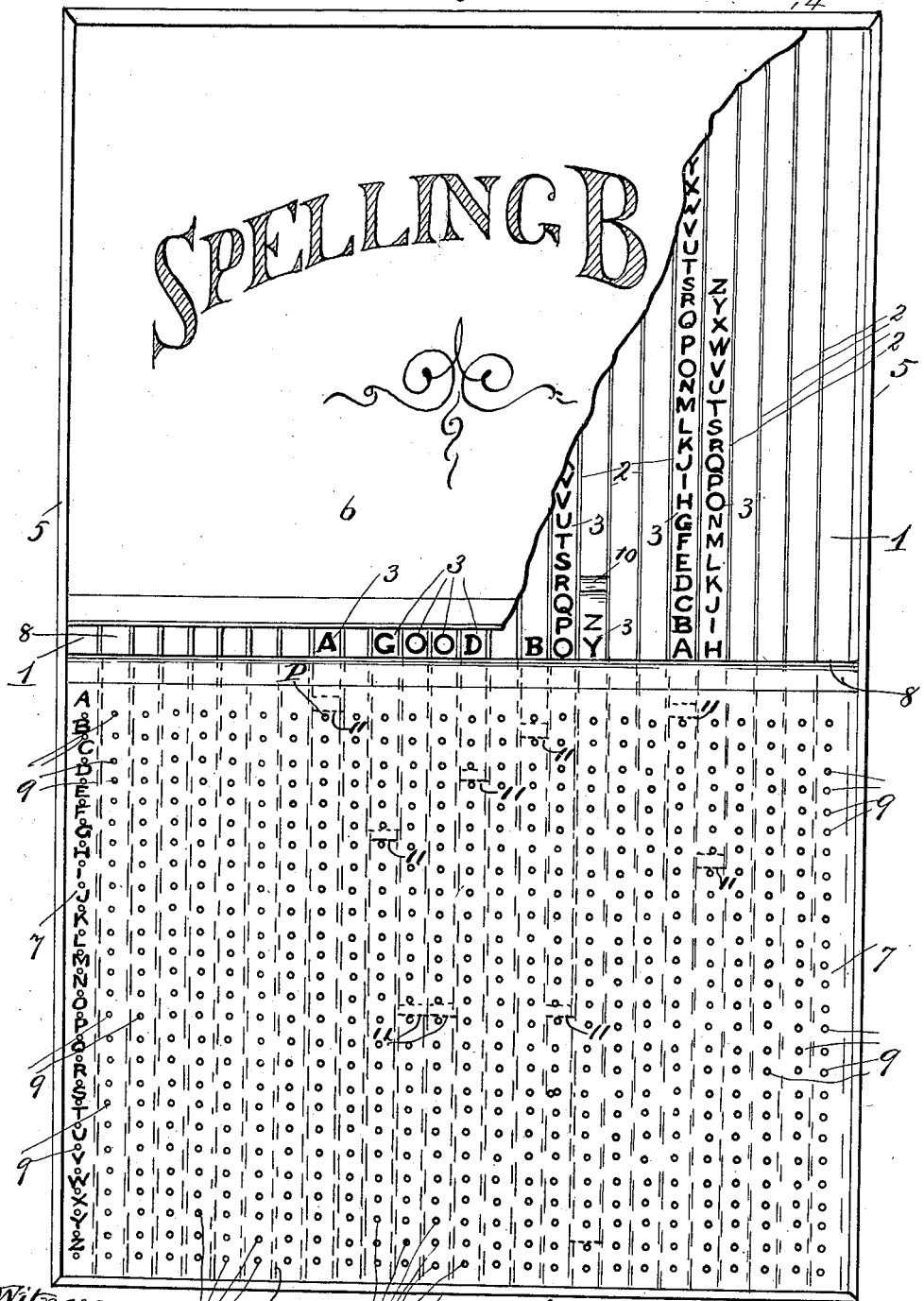

A. E. JACOBS.
SPELLING BOARD.
APPLICATION FILED DEC. 8, 1909.
1,094,570.
Patented Apr. 28, 1914.
2 SHEETS—SHEET 2.
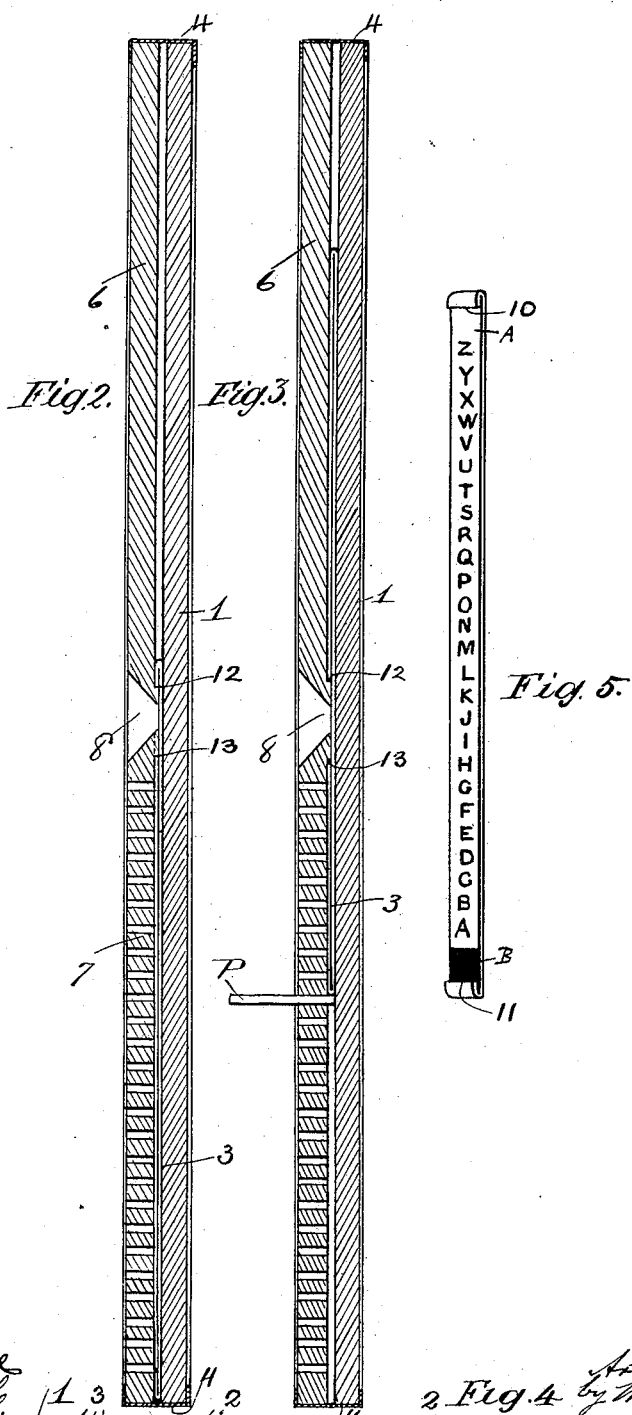

UNITED STATES PATENT OFFICE.

ARTHUR E. JACOBS, OF CLEVELAND, OHIO.

SPELLING-BOARD.

1,094,570.  Specification of Letters Patent.  Patented Apr. 28, 1914.

Application filed December 8, 1909. Serial No. 532,103.

*To all whom it may concern:*

Be it known that I, ARTHUR E. JACOBS, a citizen of the United States, and resident of Cleveland, in the county of Cuyahoga and State of Ohio, have invented certain new and useful Improvements in Spelling-Boards, of which I hereby declare the following to be a full, clear, and exact description, such as will enable others skilled in the art to which it appertains to make and use the same.

The objects of the invention are to provide a device for assisting the young student to learn to compose words and sentences from the alphabet, and to spell the words correctly or to arrange other characters such as numerals correctly in a predetermined manner, and the invention comprises primarily, a setting board in which the desired characters or spaces for them are arranged in longitudinal and transverse rows, a series of sliding strips upon which the characters are arranged, in reverse order to those on the setting board and slidingly movable relatively thereto and also comprises guiding means which permit the strips to fall by gravity in the board, reading space or opening and removable instrumentalities for limiting the movements of the sliding strips so as to expose the desired characters in a linear row in said exhibition opening.

The invention comprises preferably a setting board having on a portion of its upper surface parallel rows of perforations arranged at right angles to each other, each perforation representing a letter of the alphabet or a character, and preferably accompanied by its indicating letter or character. Beneath this board are arranged parallel strips preferably of metal which register with the vertical rows of perforations, and each strip is provided with the letters of the alphabet or other characters spaced thereon to correspond with the spacing of the vertical rows of perforations, and these alphabet slips are slidingly movable in a longitudinal direction. Pins inserted in these perforations are adapted to limit the sliding movements of the alphabet strips, so as to make the corresponding letters upon the strips appear in a transverse linear row in the said opening to form a word or a sentence. Bottom and cover boards complete the device.

The invention further consists in the combination and arrangement of parts and construction of details as hereinafter described, shown in the accompanying drawings and specifically pointed out in the claims.

In the accompanying drawings Figure 1 is a plan view of the device showing pins arranged in definite perforations so as to limit the falling of the alphabet strips and to exhibit a line of words in a transverse opening; Fig. 2 is a longitudinal section of the board in the raised position showing one of the lettered slides fallen so as to exhibit a blank space at the upper end; Fig. 3 is a similar view showing one of the slides checked in its movement by a pin inserted in one of the letter indicating openings so as to exhibit the corresponding letter in the opening; Fig. 4 is a transverse section of the board on the center line of board, as shown in Fig. 1; Fig. 5 is a perspective view of one of the alphabet strips.

In these views, 1 is a support or other suitable bottom board or plate, upon which are arranged the parallel guide strips 2, 2, between which the alphabet strips 3, 3, are adapted to slide freely, when the board is raised to the perpendicular position. The board is provided with inclosing side and end walls 4 and 5 respectively, and above the guide strips are secured the cover plate 6 at one end and a perforated and lettered setting board 7 at the other end. The upper edge of the setting board is adjacent to a narrow transverse opening 8, in which the letters upon the lettered strips 3, 3, are exposed to view. This opening is preferably arranged between the cover and setting board for convenience.

The perforated plate 7, is provided with pin holes 9, laid off in parallel rows, both longitudinally and transversely of the board. Each horizontal or transverse row represents one letter of the alphabet, as A for the top row, and there should be as many transverse rows as there are letters in the alphabet, and as many longitudinal rows can be employed as may be desired to form a sentence or sentences in the exposed space. In the figures there are 26 longitudinal and 26 horizontal rows, thus enabling each letter to be used 26 times. Other characters can be employed in place of the alphabet if desired, or can be added to them by adding to the length of the alphabet strips and by increasing the numbers of perforations in the perforated plate.

The alphabet strips 3, 3, are preferably metallic so as to fall readily by gravity and are provided with characters printed, stamped or attached to their upper surfaces to correspond in position with the characters of the vertical rows of characters in the perforated plates, and are adapted to fall between the guides by gravity when the board is raised perpendicularly. The upper and lower ends of the strips are preferably provided with shoulders, 10 and 11, which may be formed by bending backward the ends of the metallic strips, and these shoulders are adapted to engage in turn as the board is raised or lowered with the shoulders 12 and 13, which may be upon the inner edges of the opening 8. The extreme ends of the strips 3, 3, are blank, so that when they are not checked in their movements and fall their entire length no characters will appear in the opening 8. This is true also when they are returned to place underneath the cover plate 6, after use. The upper space A can be white if desired and the lower ones B black or some distinctly different color, so as to indicate visibly the position of the strips when taking up the board.

In use it is first ascertained that all the alphabet strips are underneath the cover plate 6, at the top of the device, and then pins P, P, are placed in the perforated plate, their positions corresponding with the relative positions of the desired characters upon the alphabet strips, so that when the board is raised and the strips fall, they will be checked by the pins P, P, and the desired characters will be exposed in a single line in the opening 8. To accomplish this object the characters must be arranged upon each strip in the reverse order to that of their arrangement in the perforated board as seen in Fig. 5, so that they will appear as the strips fall in the required order. For instance, to show the letter A, a pin P stuck into one of the perforations in the row "A" would check the fall of the corresponding strip 3 before the letter "A" thereon had passed the opening 8, and to show the letter "Z" the entire length of the strip must pass the opening before the letter can appear thereon.

Variations in construction of parts can be made within the scope of the appended claims.

Having described the invention, what I claim as new and desire to secure by Letters Patent is:

1. In a device for arranging a series of characters in a predetermined order, a support, a setting board thereon and spaced therefrom upon which characters are arranged in a single vertical row at one side of the board, said board provided with a series of perforations passing transversely across said board corresponding to each character, a cover, said setting board and cover having an intermediate transverse opening, strips adapted to move parallel with said vertical row of characters and provided with characters spaced to correspond with the characters in said vertical row, said strips adapted to fall by gravity, and means for limiting the movement of said strips, to expose a predetermined set of characters in linear arrangement in said transverse opening, each limiting means being adapted to be located for the desired character by positioning in the hole in the setting board that corresponds with the said character on the strip.

2. In a device for arranging characters in line in a predetermined manner, a setting board provided with perforations arranged in vertical and horizontal rows, each vertical row corresponding to a series of characters, and each horizontal row corresponding to one of said series of characters, and there being as many vertical rows as there are characters to be represented, the said setting board provided with a transverse reading space adjacent thereto, a series of parallel longitudinally moving strips behind said board, said strips adapted to fall by gravity and to register with said longitudinal rows of perforations and provided with series of characters arranged in the reverse order to the series of characters corresponding to the longitudinal rows of perforations, and pins inserted in said perforations adapted to act as stops to limit the movement of said strips, whereby the character upon any one strip corresponding to the perforations in which a pin is inserted will be exposed in said reading opening.

3. In combination, a bottom board, longitudinally movable weighted strips thereon, said strips provided with spaced characters on their upper surfaces and adapted to fall by gravity when the board is placed upright, guides for said strips, a setting board mounted upon a portion of the bottom board and provided with perforations arranged in transverse and longitudinal lines, the longitudinal lines adapted to register with said movable strips, and spaced to correspond with the characters thereon, a series of characters corresponding with the vertical lines of perforations, and reversed in order relatively to the characters on the strips, a plate over the remaining portion of the bottom board, the said cover and setting board having a reading opening between them, and pins insertible in said perforations, said pins serving as stops to limit the fall of said weighted strips, whereby the characters corresponding to the characters of the pin locations or perforations will appear in said reading opening.

4. In combination, a bottom board, a series of weighted and longitudinally movable strips thereon, a cover plate over one portion of the board and a perforated setting plate over the other portion, said plates separated at their margins to form a reading space between them, each of said strips having a series of characters arranged thereon at regular intervals, the perforations in said perforated plate arranged in transverse and longitudinal rows, the said longitudinal rows of perforations registering with said weighted strips, and corresponding to said series of characters and pins adapted to be placed in said perforations in said perforated plate.

5. In a spelling board, a supporting plate, a cover plate and a setting board spaced from said supporting plate, said cover and setting board separated by a reading space, a series of parallel sliding strips in said board beneath said setting board, each of said strips provided with a series of characters spaced on its upper surface, guides separating said strips, said strips being weighted to fall between said guides, by gravity, means for limiting the movements of said strips to expose a linear row of characters in said reading space, and means for limiting the fall of the said strips when the blank spaces thereon are disclosed, in said reading space.

In testimony whereof, I hereunto set my hand this 27 day of Nov. 1909.

ARTHUR E. JACOBS.

In presence of—
 WM. M. MONROE,
 S. M. NEVILLE.

---

Copies of this patent may be obtained for five cents each, by addressing the "Commissioner of Patents, Washington, D. C."